United States Patent Office 3,161,684
Patented Dec. 15, 1964

3,161,684
PURIFICATION OF PSEUDO-IONONE
Peter Alfred Wilkinson, South Croydon, and John Caesar Tebby, Acton, London, England, assignors to Glaxo Group Limited, Greenford, England, a British company
No Drawing. Filed May 25, 1959, Ser. No. 815,321
Claims priority, application Great Britain, June 2, 1958, 17,551/58
9 Claims. (Cl. 260—593)

This invention is concerned with improvements in or relating to the purification of pseudo-ionone.

In one method for the preparation of $\beta$-ionone from citral as present in lemon-grass oil, the latter is condensed with acetone to give a mixture of materials containing pseudo-ionone, which latter, after purification, is cyclised in an acid medium to $\beta$-ionone.

Pseudo-ionone is a heat-sensitive oil with a boiling point of about 100° C. at 1 mm./Hg pressure and comprises generally about 60% of the crude product from the first stage of the above process. It can be separated by fractional distillation under reduced pressure but this process is most unsatisfactory with conventional packed columns owing to the large pressure drop through the columns with consequent high boiler temperatures. Even in specially designed stills working at smaller differentials separation of substantially pure pseudo-ionone is a time-consuming process and prolonged heating of the material invariably gives rise to some polymerisation and, therefore, diminution of yield.

It is thus an object of the present invention to provide an improved process for the purification of pseudo-ionone.

There are several references in the literature to the use of sodium bisulphite for the purification of pseudo-ionone (Tiemann, Ber., 1898, 31, 842; Hibbert and Cannon, J.A.C.S., 1924, 46, 122 and Russell and Kenyon, Org. Synth., 1943, 23, 78) and the general method employed consists in heating under reflux for several hours a mixture of the crude pseudo-ionone with an aqueous solution containing 2–3 moles of sodium bisulphite which reacts with the desired compound forming a water-soluble complex, the majority of the impurities remaining unreacted and, therefore, extractable with an organic solvent such as ether. Having removed these impurities by solvent extraction the pseudo-ionone can be liberated from the water-soluble complex by treatment with caustic soda. The last two papers referred to above emphasise the importance of great care during this alkali treatment in order to avoid resinification of the pseudo-ionone, and suggest that at no time should there be any appreciable amount of free alkali present.

In our hands these methods have given most unsatisfactory results despite great care during the decomposition of the complex with alkali. Occasionally good yields were obtained but in general the yields were only of the order of 50%. It should be mentioned that direct comparison of our yields with those quoted in the literature is not easy as the literature methods normally start with "pure citral" and the products isolated are termed "pure pseudo-ionone," but as far as can be seen the only criterion of purity is a fairly narrow boiling range, e.g. 114–116° C. at 2 mm. or 145–150° C. at 12 mm. In our experience materials boiling over such ranges might well be only 85–90% pure based on U.V. absorption measurements together with refractive index determination. It will be seen, therefore, that the yields quoted in the literature are maximum yields and not necessarily true yields.

We have found that pseudo-ionone is not nearly so sensitive to aqueous alkaline treatment as is commonly supposed and in an experiment in which pseudo-ionone in isopropyl ether solution was stirred with an aqueous solution of sodium hydroxide for 16 hours, a 97% recovery of the starting material was obtained. We have now discovered that the factor of true importance in the bisulphite purification of pseudo-ionone resides in the use of a limited quantity of sodium bisulphite. Although we do not wish to be bound by theoretical explanations we believe that the sodium bisulphite does not react with the keto group of the pseudo-ionone in the conventional manner but reacts first of all with the $\alpha:\beta$ unsaturated bond with the formation of a $\beta$-sulphonic acid salt, and that if excess bisulphite is employed in the reaction a more stable disulphonic acid derivative is formed, probably on the $\gamma:\delta$-double bond as well as on the $\alpha:\beta$-double bond. Whereas the monosulphonic acid derivative may be decomposed with alkali with the reformation of the conjugated ketone group, the disulphonic acid derivative does not give rise to the parent compound on similar treatment.

These observations have enabled us to develop a new and improved process for the purification of pseudo-ionone based upon the formation of substantially a water-soluble monosulphonic acid derivative whilst avoiding as fas as possible formation of a disulphonic acid derivative, whereby improved yields and quality of product are obtained. According to the invention, therefore, there is provided a process for the purification of pseudo-ionone which comprises reacting the impure pseudo-ionone with an alkali metal or ammonium bisulphite, to form a complex therewith, the molar ratio of bisulphite to pseudo-ionone being less than 2 but at least sufficient to form a substantial proportion of a monosulphonic acid derivative, separating impurities from said complex by difference in solubility in aqueous media and decomposing the complex.

The ratio to pseudo-ionone in the present process is conveniently 1–1.9, preferably 1.3–1.7. In our work optimal results were obtained at a molar ratio of 1.5.

The decomposition of the resultant complex may be brought about in any convenient manner, e.g. by the use of an alkali metal hydroxide such as caustic soda.

The preferred bisulphites for use in accordance with the present invention are sodium, potassium and ammonium metabisulphites.

The formation of the water-soluble suphonic acid derivative according to the invention is advantageously conducted in the presence of an aqueous solvent medium, preferably one which is a common solvent for the reactants, pseudo-ionone and bisulphite. In this respect, aqueous ethanol or isopropanol are particularly suitable solvents, though the process may also be conducted in the presence of water alone, aqueous methanol, aqueous dioxan or aqueous tetrahydrofuran. Use of the preferred solvents, aqueous ethanol or isopropanol, possesses the additional advantage that it enables a shorter reaction time to be employed compared with other solvents. We find that water containing 15% of ethanol is very satisfactory but up to 50% aqueous ethanol can conveniently be used.

The reaction is advantageously carried out at the boiling point of the solvent medium at the ordinary pH of the bisulphite employed, additions of acid or alkali being undesirable. In the case of sodum metabisulphite thus the pH will be of the order of 4.5.

The separation of impurities from the sulphonic acid derivative of the desired product may be effected in any convenient way. In principle the separation involves formation of a solution of the sulphonic acid derivative in aqueous media and removal of insoluble and less soluble impurities for example by filtration, centrifugation or preferably by extraction with a water immiscible solvent for the impurities. Convenient solvents for the extraction of impurities are the water-immiscible ethers e.g. diethyl ether, diisopropyl ether etc.

Hibbert and Cannon (loc. cit.) claim for their process an overall yield of 55% (theory) of "pure" pseudo-ionone starting with pure citral. Russell and Kenyon (loc. cit.), by a very similar procedure, claim a yield of 45–49% of theory. In experiments according to the invention using a molar ratio of 1.5 M bisulphite in aqueous ethanol but starting with lemon-grass oil of only 74% citral content, we have obtained a yield of 64% w./w. of purity 94%, which is equivalent to 64% overall yield (theory).

In order that the invention may be well understood, the following examples are given by way of illustration only:

*Example 1*

Lemon-grass oil (2 kg., containing 74% citral), acetone (4 litres), and finely-ground barium hydroxide (100 g.) were heated under reflux with stirring for 1 hour. The mixture was cooled to 50° C. and 25% ammonium chloride solution was added to remove excess baryta. The lower layer was separated and discarded and the acetone solution evaporated, finally under reduced pressure. The residue was heated under reflux with stirring for 16 hours with a solution of sodium metabisulphite (1 kg.) in water (4 litres) and industrial methylated spirit (600 ml.). At the end of this time the industrial methylated spirit was distilled off and the cooled mixture extracted 4 times with isopropyl ether (1 x 3 litres; 3 x 1½ litres) to remove non-ketonic inmpurities. The aqueous bisulphite complex was decomposed by stirring for 2 hours at room temperature with 20% sodium hydroxide solution (2 litres) and isopropyl ether (2 litres) and the isopropyl ether solution separated. The aqueous layer was stirred for one hour with more sodium hydroxide solution (0.5 litres; 20%) and isopropyl ether (2 litres) and finally extracted with isopropyl ether (2 litres). The isopropyl ether extracts were combined, washed with water, dried and evaporated. The residue was straight distilled at 1 mm. or less to give 1.28 kg. pseudo-ionone of a purity of 94%. This corresponds to a w./w. yield of 64% from lemon-grass oil.

*Example 2*

Lemon-grass oil (100 g.), acetone (200 ml.) and finely ground barium hydroxide (5 g.) were heated and stirred under reflux for one hour. Ammonium chloride solution (20 ml., 25%) was added and after thorough mixing the lower layer discarded. The acetone was evaporated, finally under reduced pressure to give a brown oil (120 g.). The oil was heated under reflux with stirring for 18 hours with a solution of sodium metabisulphite (50 g.) in water (200 ml.) and dioxan (200 ml.). Most of the organic solvent was removed by distillation and the residue extracted thoroughly three times with isopropyl ether. The extracts contained 22 g. of unreacted impurities. The aqueous layer was stirred for 2 hours with isopropyl ether (100 ml.) and 20% sodium hydroxide solution (100 ml.) and the organic layer separated. Stirring was continued for a further hour with isopropyl ether (100 ml.) and 20% sodium hydroxide solution (25 ml.) and the isopropyl ether separated. Finally, the aqueous layer was extracted with isopropyl ether (100 ml.). The combined solvent layers were evaporated to give 73 g. of pseudo-ionone $E_{1 cm.}^{1\%}$ at $\lambda_{max}$ 292 m$\mu$ = 1150

Distillation of the product at 1 mm. yielded 61 g. of pseudo-ionone $E_{1 cm.}^{1\%}$ at $\lambda_{max}$ 292 m$\mu$ = 1210 (90%)

*Example 3*

This experiment was carried out exactly as Example 2 except that the dioxan was omitted. The weight of unreacted material was 24 g. and the product as undistilled pseudo-ionone weighed 75 g.

*Example 4*

This experiment was carried out exactly as Example 2 save that the dioxan was replaced by ethanol. The unreacted impurities amounted to 24 g. and the product as undistilled pseudo-ionone was 72 g.

*Example 5*

This experiment was carried out as Example 2 but the dioxan was replaced with 30 mls. isopropyl alcohol. The weight of unreacted material was 22.5 g. and the product as undistilled pseudo-ionone weighed 72 g.

We claim:
1. A process for the purification of pseudo-ionone containing water-insoluble impurities which comprises reacting, in the presence of an aqueous solvent medium, the impure pseudo-ionone with a bisulphite selected from the group consisting of alkali metal and ammonium bisulphites to form a water-soluble complex with pseudo-ionone without rendering said impurities water-soluble, the molar ratio of bisulphite to pseudo-ionone being from 1.0 to less than 2.0, dissolving said complex in an aqueous medium, separating water insoluble impurities from said complex dissolved in said aqueous medium and decomposing the complex.
2. A process as claimed in claim 1 in which said bisulphite is sodium metabisulphite.
3. A process as clamed in claim 1 in which the molar ratio of bisulphite to pseudo-ionone is from 1.3 to 1.7.
4. A process as claimed in claim 1 in which the molar ratio of bisulphite to pseudo-ionone is 1.5.
5. A process as claimed in claim 1 in which the solvent medium is selected from the group consisting of water, aqueous ethanol, aqueous isopropanol, aqueous methanol, aqueous dioxan and aqueous tetrahydrofuran.
6. A process as claimed in claim 1 in which impurities are separated from said complex by extraction of a solution thereof in an aqueous medium with a water-immiscible solvent.
7. A process as claimed in claim 6 in which said solvent is an ether.
8. A process as claimed in claim 1 in which the resultant complex is decomposed with an alkali metal hydroxide.
9. A process for the purification of pseudo-ionone containing water-insoluble impurities which comprises reacting impure pseudo-ionone in an aqueous water-miscible organic solvent medium with a bisulphite selected from the group consisting of alkali metal and ammonium bisulphites to form a water-soluble complex between said bisulphite and the pseudo-ionone without rendering said impurities water-soluble, the molar ratio of said bisulphite to pseudo-ionone being within the range of from 1.0 to 1.9, separating the water-insoluble impurities by extraction with a water-immiscible solvent and decomposing said complex by reaction with an alkali metal hydroxide.

References Cited by the Examiner
UNITED STATES PATENTS
2,544,562  3/51  Michael _____ 260—593

OTHER REFERENCES

Hibbert et al.: Journal of the American Chemical Society, vol. 46 (January, 1924), pages 119–130.

Fieser et al.: Organic Chemistry (2nd ed.), (1950), pages 203–205.

References Cited by the Applicant

Russell et al.: Organic Syntheses, vol. 23, pp. 78–82 (1943).

LORRAINE A. WEINBERGER, *Acting Primary Examiner.*

CHARLES B. PARKER, LEON ZITVER, *Examiners.*